(12) United States Patent
Beland et al.

(10) Patent No.: US 8,089,032 B2
(45) Date of Patent: Jan. 3, 2012

(54) WALL MOUNT ELECTRONIC CONTROLLER

(75) Inventors: Stephane Beland, St-Jean-sur-Richelieu (CA); Francois Houde, Mont St-Gregoire (CA)

(73) Assignee: Honeywell International Inc., Morristown, NJ (US)

( * ) Notice: Subject to any disclaimer, the term of this patent is extended or adjusted under 35 U.S.C. 154(b) by 1423 days.

(21) Appl. No.: 11/553,966

(22) Filed: Oct. 27, 2006

(65) Prior Publication Data

US 2008/0151458 A1    Jun. 26, 2008

(51) Int. Cl.
*H05B 1/02* (2006.01)

(52) U.S. Cl. ........ 219/492; 219/509; 219/497; 361/728; 340/870.17

(58) Field of Classification Search .............. 219/493, 219/494, 497, 501, 505; 340/501, 525, 840.17, 340/840.18; 361/632, 709, 728
See application file for complete search history.

(56) References Cited

U.S. PATENT DOCUMENTS

| | | | |
|---|---|---|---|
| 3,629,770 A * | 12/1971 | Fortier et al. | 337/333 |
| 4,824,013 A | 4/1989 | Gouldey | |
| 5,485,954 A | 1/1996 | Guy et al. | |
| 5,558,436 A | 9/1996 | Richards | |
| 6,032,867 A * | 3/2000 | Dushane et al. | 236/51 |
| 6,974,910 B2 | 12/2005 | Rohmer | |
| 7,075,009 B1 | 7/2006 | Rohmer | |
| 7,400,239 B2 * | 7/2008 | Kiko et al. | 340/501 |

OTHER PUBLICATIONS

"Cooler Controller," Dial Manufacturing, Inc., I page prior to Oct. 27, 2006.
"EziStat PowerPak, Slimline Integrated Cooler Control for Two-Speed Evaporative Cooler, Installation Instructions," AR 1329 Issue 1, 4 pages, prior to Oct. 27, 2006.
ETI, "FWT 3H Hydronic Thermostat, Installation and Operating Instructions," Environmental Technology, Inc., 4 pages, Jun. 2000.
Honeywell, "T6570 Series Digital Fan-Coil Thermostats, Product Data," Honeywell, Inc., 8 pages, 2000.
http://catalogs.infocommiq.com/AVCAT/CTL640index.cfm?..., "AMX Productline," 4 pages, printed Sep. 27, 2006.
http://www.asihome.com/ASIshop/product_infophp?..., "Leviton ACWM2-SS-Acenti Double Gang Wallplate—Stainless Steel," 2 pages, printed Sep. 27, 2006.
http://www.dimplex.de/english/produkte/steuerungregelung/flaechenschalter.php, "Dimplex—Control/Regulation," 4 pages, printed Sep. 27, 2006.
http://www.kennspenns.com/coolerparts/thermostats.html, "Evaporative Swamp Cooler Thermostats," 3 pages, printed Sep. 27, 2006.
https://www.tselectronic.com/leviton_ac/accenti_wallplate.html?tse..., "Leviton Acenti Wallplates," 2 pages, printed Oct. 16, 2006.
http://www.hotelthermostat.com, "Carrier Hotel Thermostats," 2 pages, printed Sep. 27, 2006.

(Continued)

*Primary Examiner* — Mark Paschall
(74) *Attorney, Agent, or Firm* — Seager, Tufte & Wickhem LLC

(57) ABSTRACT

An electronic controller that is adapted to cooperate with a decorative wall plate is provided. In one illustrative embodiment, the electronic controller may be adapted to be mounted in a junction box, with a user interface having a shape and size to fit within one or more apertures in a wall plate. The wall plate may be secured relative to the electronic controller and/or junction box such that the user interface extends at least partially through the one or more aperture in the wall plate.

28 Claims, 7 Drawing Sheets

OTHER PUBLICATIONS http://www.lashen.com/vendors/calrad/keystone.asp, "Keystone Inserts and Decora Walljacks," 14 pages, printed Sep. 27, 2006.
http://www.smarthome.com/865119.HTML, "Chopin Decora Volume Control System," 2 pages, printed Sep. 27, 2006.
http://www.smarthome.com/1522.html, "Decora-Style Analog Temperature Sensor," 3 pages, printed Sep. 27, 2006.
http://www.smarthome.com/9272dhw.html, "Humidity, Thermometer Wall Plate—11101," 3 pages, printed Sep. 27, 2006.
http://www.smarthome.com/1122w.html, "Leviton In-Wall LCD Timer," 3 pages, printed Sep. 27, 2006.
http://www.smarthome.com/8989RW.HTML, "Stylish Wall Plates With Covers!," 3 pages, printed Sep. 27, 2006.
http://www.smarthome.com9272s2i.html, "Toggle 2-Gang Wallplate Thermometer—Ivory—22200," 2 pages, printed Sep. 27, 2006.
http://thermostatusa.com/p3741000fm.asp, "Totaline Programmable/Non-Programmable Flush Mount Thermostat P374-1000FM," 1 page, printed Oct. 2, 2006.
Leviton, "Decora Devices Catalog," 36 pages, prior to Oct. 27, 2006.
Nuheat, "Electrician's Instructions for Model NG110 (120 VAC)," 1 page, May 14, 2003.
Nuheat, "HMY110/HMY220 User Guide Electronic Thermostats," 4 pages, Jun. 15, 2006.
Nuheat, "Homeowner's Guide for Model NTG5110 (120 VAC)," 2 pages, May 14, 2003.
Ritetemp, "Install Guide 8046," 6 pages, prior to Oct. 27, 2006.
Totaline, "Digital Thermostat Model P374-1100FM, Installation Instructions," 12 pages, Nov. 1998.
WarmTouch, "SHE 2000 SFS (WarmTouch Carpet) Installation/Homeowner's Manual & Warranty Registration Information," 13 pages, Dec. 5, 2002.

* cited by examiner

WALL MOUNT ELECTRONIC CONTROLLER

TECHNICAL FIELD

The present invention relates generally to electronic controllers, and more particularly to electronic controllers that are mounted in or on walls.

BACKGROUND

Electronic controllers are used on a wide variety of applications including for controlling various functions in homes and/or buildings and their related grounds. Examples electronic controllers include (Heating Ventilation and/or Air Conditioning) HVAC controllers, in-floor heating controllers, water heater controllers, water softener controllers, security system controllers, lawn sprinkler controllers, audio-visual system controllers, and lighting system controllers, to name just a few. In one example, HVAC controllers are often employed to monitor and, if necessary, control various environmental conditions within a home, office, or other enclosed space. Such devices are useful in, for example, regulating any number of environmental conditions within a particular space including for example, temperature, humidity, venting, air quality, etc. Security system controllers are often employed to monitor and/or control access to a building or other structure, and in-floor heating controllers are often used to control the temperature of a floor within a building or other structure.

Many such electronic controllers include a microprocessor that interacts with other components of a system. For example, modern thermostats for use in a home or other building often include a controller unit that interacts with a heater, blower, flue vent, compressor, humidifier and/or other system components, to control the temperature and/or other environmental parameters at various locations within the home or other building. In some cases, one or more sensors located within the controller unit and/or at one or more remote locations may be used to sense when the temperature and/or other parameters reach a certain threshold level (e.g. set point), causing the controller unit to send a signal to activate or deactivate one or more component in the system.

Modern electronic controllers are often equipped with a user interface that allows the user to monitor and/or adjust the environmental conditions at one or more locations within the building. Some electronic controllers are programmable, allowing the user to program the desired functionality and/or control parameters of the electronic controller. For example, some electronic thermostats allow the user to program a temperature schedule, often using the user interface. In many cases, the user interface often includes a liquid crystal display (LCD) panel or the like, as well as one or more control buttons. The control buttons are often either provided as tactile buttons separate from the display, and/or integrated with the display as is the case with some touch screen interfaces.

Such electronic controllers are often mounted directly onto the surface of a wall, and extend out from the wall. While this may allow the electronic controllers to function properly and provide access to the user interface of the electronic controller, it can sometimes detract from the visual appearance of the wall.

SUMMARY

The present invention relates generally to electronic controllers, and more particularly to electronic controllers that are mounted in or on walls. In one illustrative embodiment, an electronic controller is provided that can be mounted in an electrical junction box or the like in a wall, and may be configured to be used in conjunction with a decorative wall plate. In some cases, the electronic controller may fit into an electrical junction box having two or more gangs, but this is not required.

An illustrative but non-limiting example of the present invention may be found in an electronic controller that has a user interface. The electronic controller is adapted to be mounted in a junction box, with the user interface having a shape and size to fit within one or more apertures in a wall plate. The wall plate may be secured relative to the electronic controller and/or junction box such that the user interface extends at least partially through the one or more aperture in the wall plate.

In some cases, the electronic controller may include a display panel and a control panel, wherein the control panel is arranged alongside but spaced from the display panel. The display panel and the control panel may each be adapted to extend through a common or separate apertures in the wall plate. In some instances, the display panel may be adapted to extend into and/or through a first aperture in a wall plate and the control panel may be adapted to extend into and/or through a second aperture in the wall plate.

In some embodiments, an electronic controller may include a housing that has a front surface, wherein a display panel and/or a control panel may extend away from the front surface of the housing for a distance of about 5 to about 10 millimeters, forming one or more projections. In some cases, the housing may be configured to fit into and possibly be secured within a wall-mounted junction box that has at least a first gang and a second gang. When provided, the display panel may, if desired, have a length of about 60 to about 80 millimeters and a width of about 30 to about 40 millimeters. Likewise, the control panel may have a length of about 60 to about 80 millimeters and a width of about 30 to about 40 millimeters. The display panel and the control panel may be spaced apart a distance of about 10 to about 20 millimeters, if desired.

It should be recognized that these dimensions are only illustrative. Each of the projections formed by the display panel and/or control panel may fit within a corresponding aperture in a decorate wall plate, if desired. When so provided, the decorate wall plate may be visible to the user, with the display panel and/or control panel filling the apertures within the decorative wall plate. This may provide an attractive visual appearance to the user.

The above summary is not intended to describe each disclosed embodiment or every implementation of the present invention. The Figures and Detailed Description which follow more particularly exemplify these embodiments.

BRIEF DESCRIPTION

The invention may be more completely understood in consideration of the following detailed description of various embodiments of the invention in connection with the accompanying drawings, in which.

Figure 1:
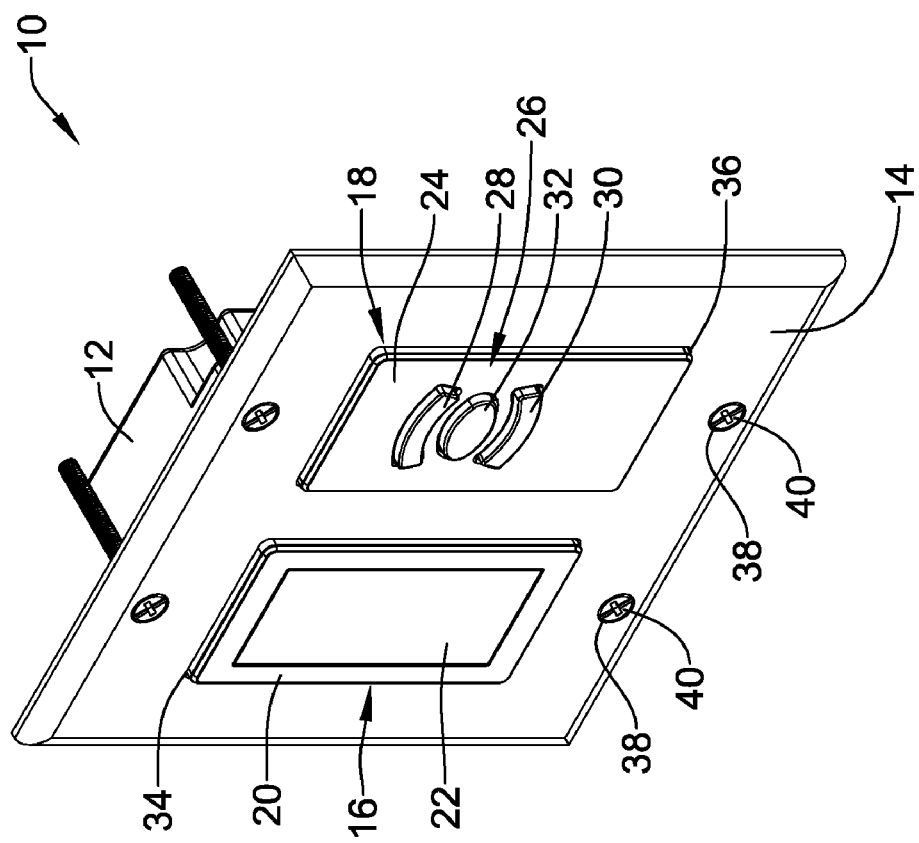
FIG. 1 is a perspective view of a controller and decorative wall plate in accordance with an illustrative but non-limiting example of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all passive and active modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

The present invention relates generally to electronic controllers, and more particularly to electronic controllers that are mounted in or on walls. Examples of electronic controllers that are mounted in or on walls include controllers such as low voltage thermostats as well as line voltage thermostats. Thermostats may be used in controlling the temperature and/or other parameters in a home or other building structure, which can include in-floor heating thermostats for controlling the temperature of an in-floor heating system.

Merely for illustrative purposes, the following description refers to thermostats. This is, however, not intended to limit the invention in any way, as it is contemplated that the present invention may be applied to any suitable type of electronic controller that can be mountable in or on a wall including, for example, water heater controllers, water softener controllers, security system controllers, lawn sprinkler controllers, audio-visual system controllers, and lighting system controllers, to name just a few.

FIG. 1 is a perspective view of an illustrative thermostat assembly 10 that includes a thermostat 12 and a wall plate 14. Thermostat 12 may be configured to control and/or power a variety of equipment, including but not limited to forced air heating systems, air conditioning systems, air filtration equipment, air exchangers, humidifiers, dehumidifiers, hot water heat, steam heat, electrical resistive heating including in-floor resistive heating mats, and the like.

The illustrative thermostat 12 may be seen as including a display panel 16 and a control panel 18. In some cases, display panel 16 may have at least a substantially rectangular profile and may have a length of about 60 to about 80 millimeters and a width of about 30 to about 40 millimeters, but this is not required. In some instances, control panel 18 may have at least a substantially rectangular profile and may have a length of about 60 to about 80 millimeters and a width of about 30 to about 40 millimeters, but again this is not required.

In some cases, the display panel 16 may have a viewable area that is at least about 75 percent of an area of the corresponding aperture in the wall plate 40, and in some cases at least about 90 percent. Likewise, the control panel 18 may have a useable area that is at least about 75 percent of an area of the corresponding aperture of the wall plate 40, and in some cases at least about 90 percent.

In the illustrative embodiment, the display panel 16 has a major dimension that is at least substantially vertical and control panel 18 has a major dimension that is at least substantially vertical. In this, vertical refers to an installed orientation of the thermostat assembly 10. In some cases, the major dimension of the display panel 16 may be at least substantially parallel to the major dimension of the control panel 18.

While display panel 16 and control panel 18 are illustrated as having rectangular or at least substantially rectangular profiles, it will be recognized that other shapes are contemplated. For example, display panel 16 and/or control panel 18 may have an elongated ovoid shape, or any other shape as desired. In some cases, display panel 16 and/or control panel 18 may incorporate an hourglass shape, much like the shape exhibited by some standard receptacles, for example.

As illustrated, display panel 16 may include a display panel surface 20 and a display 22 that is disposed within the display panel surface 20. In the illustrative embodiment, display 22 may include or be any suitable display structure that is configured to provide a visual representation discernible to the human eye. In some instances, display 22 may be an LCD (liquid crystal display), but this is not required.

Display panel 16 may provide a variety of information to the user. For example, display panel 16 may simultaneously display one or more of a day of the week, an actual temperature, a temperature set point, an indication of whether a particular piece of HVAC equipment is running, a fan setting, an equipment setting, and the like. In some cases, display panel 16 may include a backlight to enhance visibility under darker ambient conditions.

As illustrated, control panel 18 includes a control panel surface 24 and several control fixtures or buttons 26. It will be recognized that in some cases, control panel 18 may be a touch screen. In the illustrated embodiment, control panel 18 includes an up arrow button 28, a down arrow button 30 and a select button 32. In other instances, control panel 18 may include either fewer or more buttons, depending on, for example, whether or not thermostat 12 is a programmable thermostat. In some cases, it will be recognized that up arrow button 28 may be used to raise a desired temperature set point, to increase a fan speed, to increase a desired humidity level, to change a setting when in a programming mode, or any similar function. Similarly, down arrow button 30 may be used to decrease a desired temperature set point, to decrease a fan speed, to decrease a desired humidity level, to change a setting when in programming mode, or any similar function. Select button 32 may have any necessary function, such as selecting a particular menu item, or perhaps tabbing through menu options to select a particular menu, parameter and/or parameter value.

The illustrative wall plate 14 includes a first aperture 34 into which display panel 20 may extend and a second aperture 36 into which control panel 24 may extend. In some instances, wall plate 14 may be considered as being a decorative wall plate. Some decorative wall plates on the market today are configured to accommodate a wide variety of commercially available electrical devices such as receptacles, GFCI receptacles, switches such as rocker switches, dimmer switches, low voltage wiring devices and the like. Some suitable decorative wall plates are commercially available from Leviton Manufacturing Company, located in Little Neck, N.Y., and which are sold under the trademark Decora™.

In some cases, and as shown in FIG. 1, the wall plate 14 may have rectangular or substantially rectangular apertures for each gang of a junction box. When so provided, the display panel 16 and the control panel 18 may be sized and shaped to extend into the spaced apertures in the wall plate 14, as shown. In some cases, and as better shown in FIG. 2, the display panel 16 and the control panel 18 may extend away from a front surface of the thermostat housing forming one or more projections that are adapted to extend into the apertures in the wall plate 14.

Figure 6:
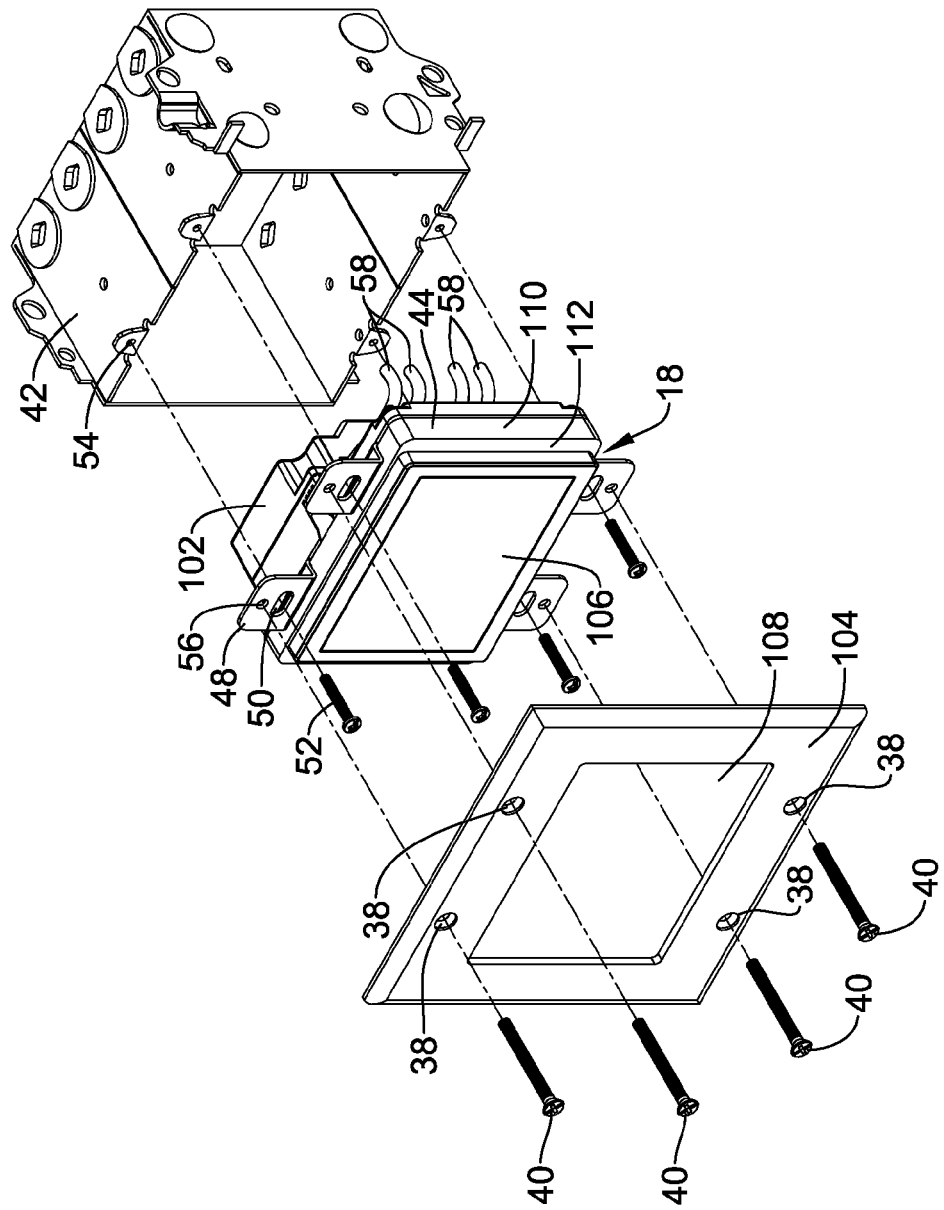
FIG. 6 is an exploded perspective view of a controller, decorative wall plate and junction box in accordance with an illustrative but non-limiting example of the present invention.

In other cases, the wall plate 14 may have a single larger aperture that extends across at least part of two or more gangs of a junction box. When so provided, the display panel and/or control panel may be included on a single projection that is sized and shaped to extend into the single larger aperture in the wall plate. In one illustrative embodiment, it is contemplated that the display panel may be a touch screen display, and may extend through the single larger aperture in the wall plate. When so provided, a separate control panel 18 may not be required or even desired. FIG. 6, which will be discussed hereinafter, illustrates a possible touch screen display.

It is contemplated that the aperture(s) formed in the wall plate may have any suitable shape or configuration, such as an elongate ovoid shape or an hourglass shape, and the display panel 16 and/or control panel 18 may have one or more corresponding projections that is/are sized and shaped to extend into the corresponding aperture(s) of the wall plate.

In one illustrative embodiment, the first aperture 34 in the wall plate 14 may be configured to accommodate a rectangular or substantially rectangular device or portion of a device that has a length of about 60 to about 80 millimeters and a width of about 30 to about 40 millimeters. In particular cases, the first aperture 34 may have a length of about 66 to about 67 millimeters and a width of about 33 to about 34 millimeters. In some instances, the second aperture 36 in the wall plate 14 may be configured to accommodate a rectangular or substantially rectangular device or portion of a device that has a length of about 60 to about 80 millimeters and a width of about 30 to about 40 millimeters. In particular cases, the second aperture 36 may have a length of about 66 to about 67 millimeters and a width of about 33 to about 34 millimeters. It should be recognized that these dimensions are only illustrative.

In some instances, wall plate 14 may be secured to the thermostat 12. As illustrated, wall plate 14 may include several mounting apertures 38 that are sized to accommodate screws 40. Each screw 40 may pass through a corresponding mounting aperture 38 and engages the housing, as is shown in greater detail in FIG. 2.

Figure 2:
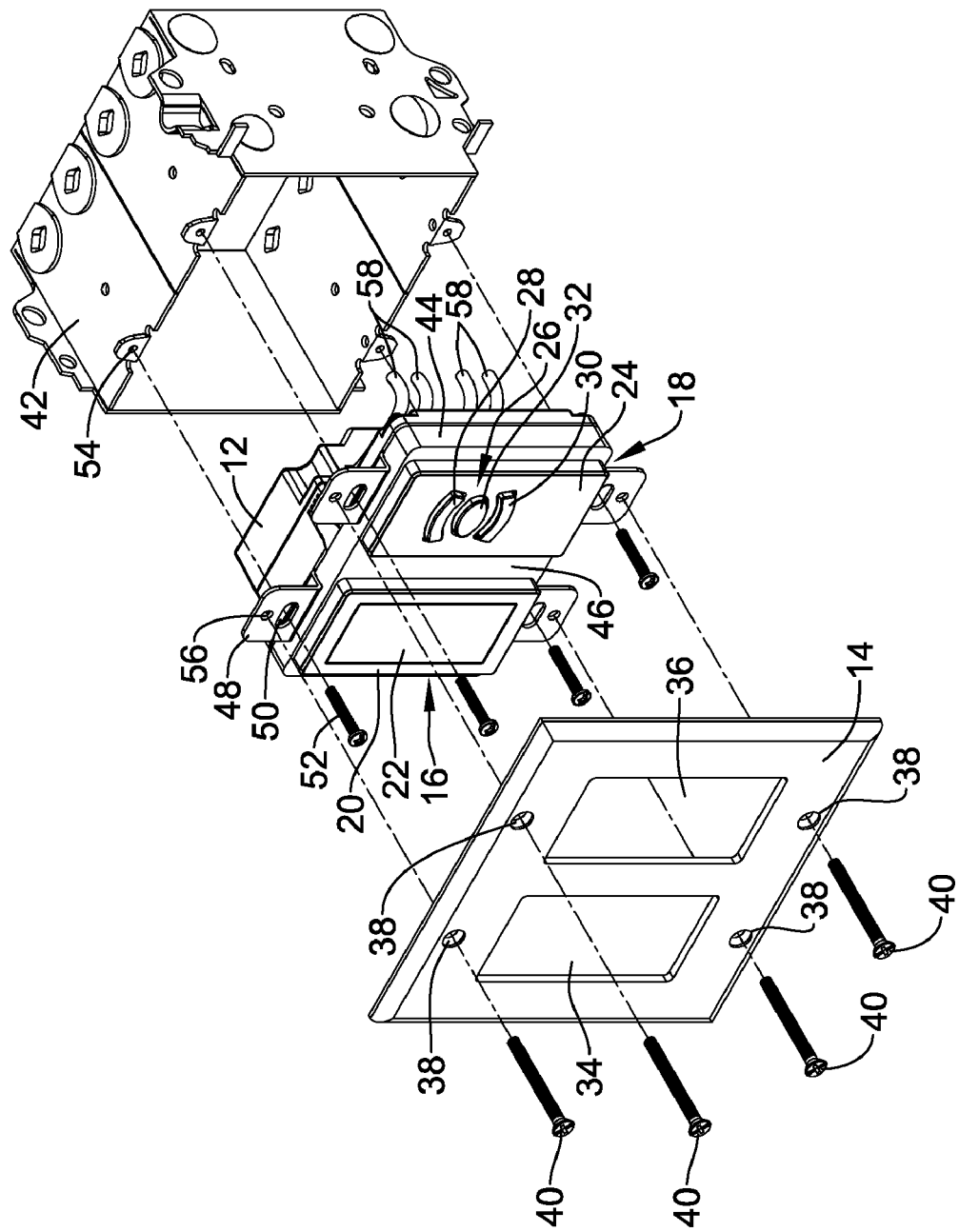
FIG. 2 is an exploded perspective view of a controller, decorative wall plate and junction box in accordance with an illustrative but non-limiting example of the present invention.

FIG. 2 is an exploded perspective view that illustrates a relative arrangement between the illustrative thermostat 12, wall plate 14 and a junction box 42 as well as showing additional details of thermostat 12. In the illustrative embodiment, thermostat 12 includes a housing 44 that has a front surface 46. Display panel 16 and control panel 18 may be seen as extending from front surface 46 forming two projections. Display panel 16 and/or control panel 18 may extend any desirable distance from front surface 46, depending on, for example, the design and construction of wall plate 14. In some instances, display panel 16 and/or control panel 18 may extend a distance of about 5 to about 10 millimeters from front surface 46, but this is not required.

In some instances, display panel 16 and control panel 18 may be spaced a discrete distance apart on front surface 46. This spacing may be adjusted or configured to accommodate a particular decorative wall plate, for example. In some cases, as will be discussed in greater detail with respect to FIG. 5, the spacing between display panel 16 and control panel 18 may accommodate additional functionality such as external sensor connections and the like, but this is not required.

The illustrative housing 44 includes mounting tabs 48. Mounting tabs 48 may each include an aperture 50 that is sized to permit a mounting screw 52 to pass through. In some instances, aperture 50 may have an elongate shape to permit small adjustments in mounting thermostat 12. Each mounting screw 52 may pass through a corresponding aperture 50, and may threadedly engage a threaded aperture 54 that is disposed within junction box 42 and thus secure thermostat 12 to junction box 42. Mounting tabs 48 may also each include a threaded aperture 56 that is configured to threadedly engage screw 40 and thus secure wall plate 14 to thermostat 12.

In some instances, thermostat 12 includes several electrical leads 58 that may be used to provide electrical communication between the thermostat 12 and whatever equipment thermostat 12 is intended to control. In some cases, thermostat 12 may be configured to power and control a resistive in-floor heating system, in which case two of electrical leads 58 may be connected to a power supply while two of electrical leads 58 may be connected to an in-floor resistive heating mat. In some cases, thermostat 12 may be adapted to control a forced air furnace and/or air conditioning unit, in which case electrical leads 58 may represent low voltage connections between thermostat 12 and the forced air furnace and/or air conditioning unit (not illustrated).

As illustrated, junction box 42 is a metal or plastic two gang junction box. Each gang is sized to accommodate an electrical device such as a receptacle, a light switch, or the like. In some instances, junction box 42 may be a new construction junction box which is configured to be secured to a stud or other vertical support structure. In some cases, junction box 42 may instead be a remodel junction box, which is configured to be inserted through a hole in a wall surface and secured to the wall surface itself.

Figure 3:
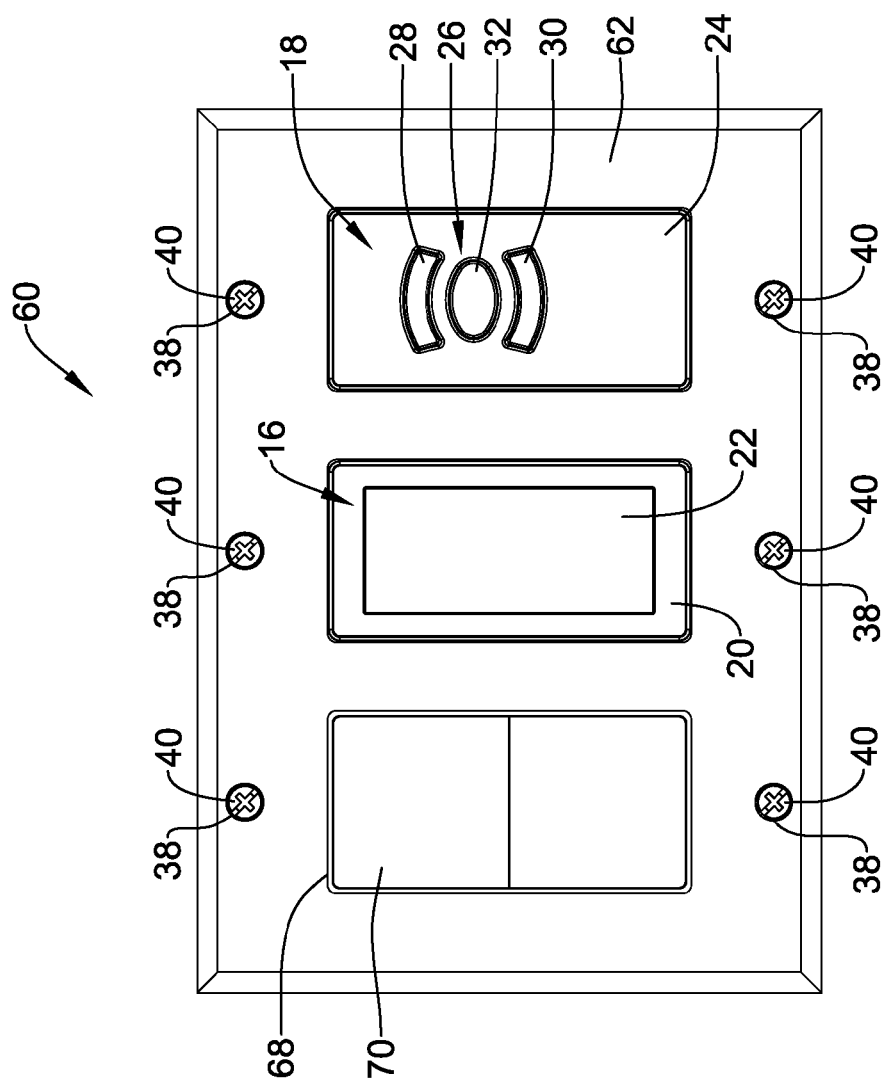
FIG. 3 is a front view of a controller and decorative wall plate in accordance with an illustrative but non-limiting example of the present invention.

While the junction box 42 is shown in FIG. 2 as a two gang junction box, it is contemplated that junction box 42 may be a one-gang junction box, a three gang junction box, a four gang junction box, or an even larger junction box. FIG. 3 is a front view of an assembly 60 that uses a three gang junction box. Assembly 60 includes a wall plate 62 that includes a first aperture 64 that is adapted to accommodate display panel 16 and a second aperture 66 that is adapted to accommodate control panel 18. Wall plate 62 also includes a third aperture 68 that is adapted to accommodate some other electrical device 70.

As illustrated, electrical device 70 is a rocker-style switch that may be used to control a light or a receptacle, for example. In some cases, electrical device 70 may provide a switch and dimmer function. When smaller-sized light switch are used, the third aperture 68 may be changed in size to accommodate the particular dimensions of electrical device 70. In some instances, electrical device 70 may provide additional functionality to thermostat 12. For example, electrical device 70 may include an external temperature and/or humidity sensor that can be electrically connected to thermostat 12.

Figure 4:
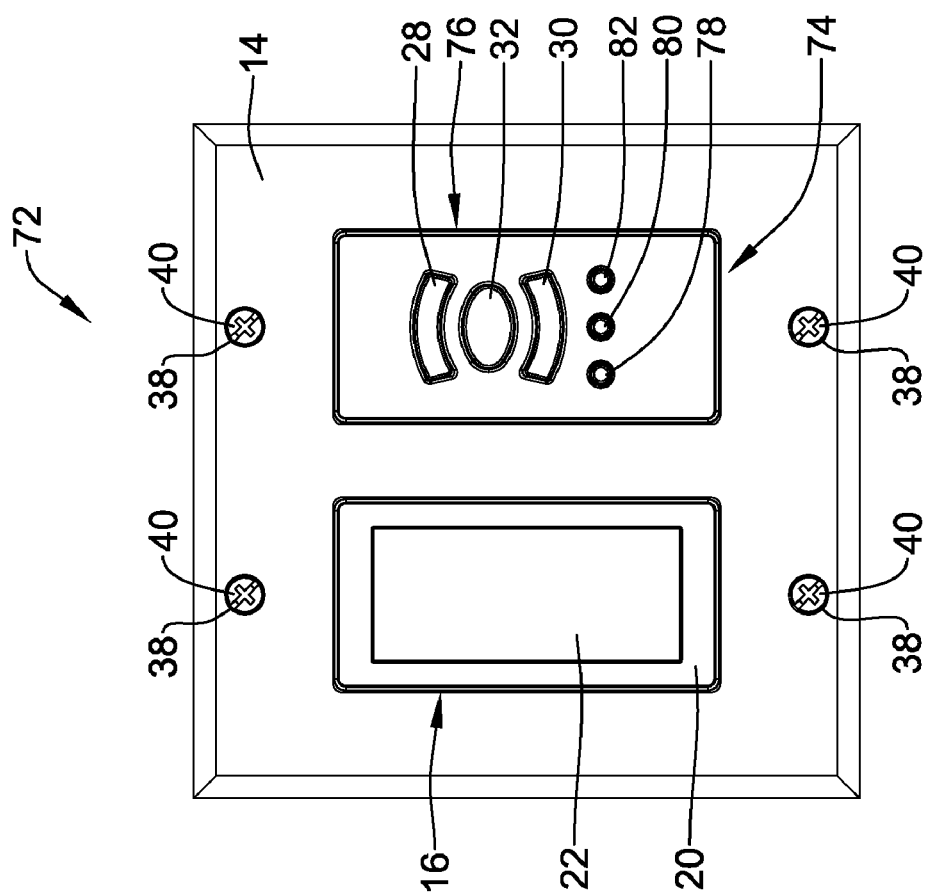
FIG. 4 is a front view of a controller in accordance with an illustrative but non-limiting example of the present invention.

FIG. 4 is a front view of an illustrative assembly 72 that includes a thermostat 74 and wall plate 16. Thermostat 74 includes a control panel 76 including up arrow button 28, down arrow button 30 and select button 32, as discussed previously with respect to FIG. 1. In some instances, thermostat 74 may include additional buttons, depending on the particular equipment that thermostat 74 is configured to control. In the illustrated embodiment, control panel 76 also includes a program button 78, a day button 80 and an enter button 82. These buttons may be used in combination to program thermostat 74.

In some cases, thermostat 74 may be programmed to, for example, operate on the same temperature profile or schedule each day of the week. In some cases, thermostat 74 may be programmed to operate on a 5/2 program in which a first temperature profile is followed Monday through Friday, for example, and a second temperature profile is followed Saturday and Sunday. In some instances, thermostat 74 may be programmed to operate on a 7 day program, in which a distinct temperature profile is followed on each of the seven days of the week.

Figure 5:
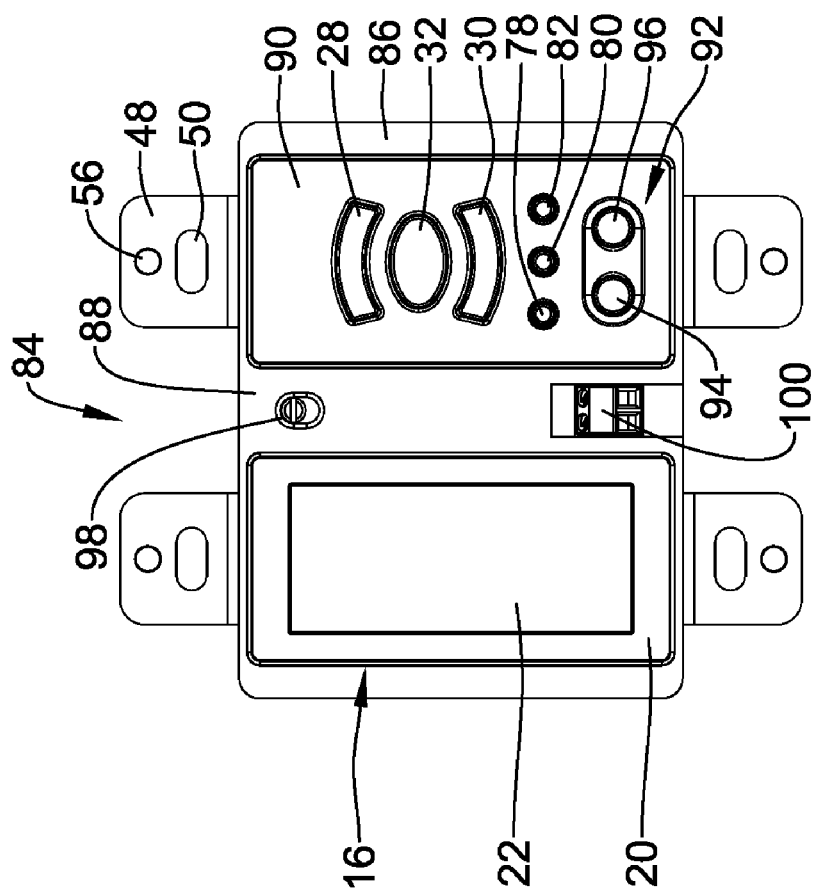
FIG. 5 is a front view of a controller in accordance with an illustrative but non-limiting example of the present invention.

FIG. 5 is a front view of an illustrative thermostat 84. As noted above, the thermostats described herein may be configured to control and/or power a variety of equipment. In some instances, thermostat 84 (as illustrated) may be adapted to regulate and power an in-floor resistive heating system. The illustrative thermostat 84 includes a housing 86 that has a front surface 88. Display panel 16 extends from front surface 88 forming a projection, as does control panel 90.

It will be recognized that in-floor heating may be used in potentially damp locations such as kitchens and bathrooms. Thus, along with the buttons previously discussed, control panel 90 may also include a GFCI (ground fault circuit interrupt) 92 that has a test button 94 and a reset button 96.

In-floor heating may be placed under a variety of flooring materials such as concrete, ceramic tile, stone tile, hardwood flooring, engineered wood flooring, carpeting and the like. In some cases, some flooring materials such as hardwood flooring and ceramics such as concrete and ceramic may endure relatively higher temperatures while other materials such as laminates and engineered wood flooring may require relatively lower operating temperatures. In some cases, thermostat 84 may include a temperature limit switch 98 that can be moved between a relatively higher setting and a relatively lower setting.

In some instances, thermostat 84 may be in electrical communication with a temperature sensor that is disposed within or under the floor in order to provide thermostat 84 with feedback regarding floor temperature. In some cases, thermostat 84 may include a connection block 100 that is adapted to provide electrical communication between a remote floor sensor and thermostat 84.

In some cases, thermostat 84 may instead be adapted to control other equipment in which air temperature is relied upon for temperature feedback. In such cases, thermostat 84 (or thermostat 12) may include a temperature sensor (not illustrated) that may be disposed directly behind control panel 90. In some cases, thermostat 84 (or thermostat 12) may be in electrical communication with a remote temperature sensor such as that discussed above with respect to electrical device 70 (FIG. 3). In some cases, an aperture (not shown) may be formed in a portion of control panel 90 or other part of the thermostat housing to allow air to thermally contact a temperature sensor. In some instances, such an aperture may include vertically aligned fins to facilitate air movement across a temperature sensor, but this is not required.

FIG. 6 is an exploded perspective view that illustrates a relative arrangement between a thermostat 102, a wall plate 104 and junction box 42. In the illustrated embodiment, thermostat 102 has a housing 110 that has a front surface 112. A touch screen 106 extends from front surface 112 of housing 110. Wall plate 104 includes an aperture 108 that is adapted to extend across at least part of two gangs of junction box 42. In some cases, as discussed above, junction box 42 may have more than two gangs. Touch screen 106 is adapted to extend at least partially into aperture 108 when wall plate 104 is secured relative to housing 110.

Figure 7:
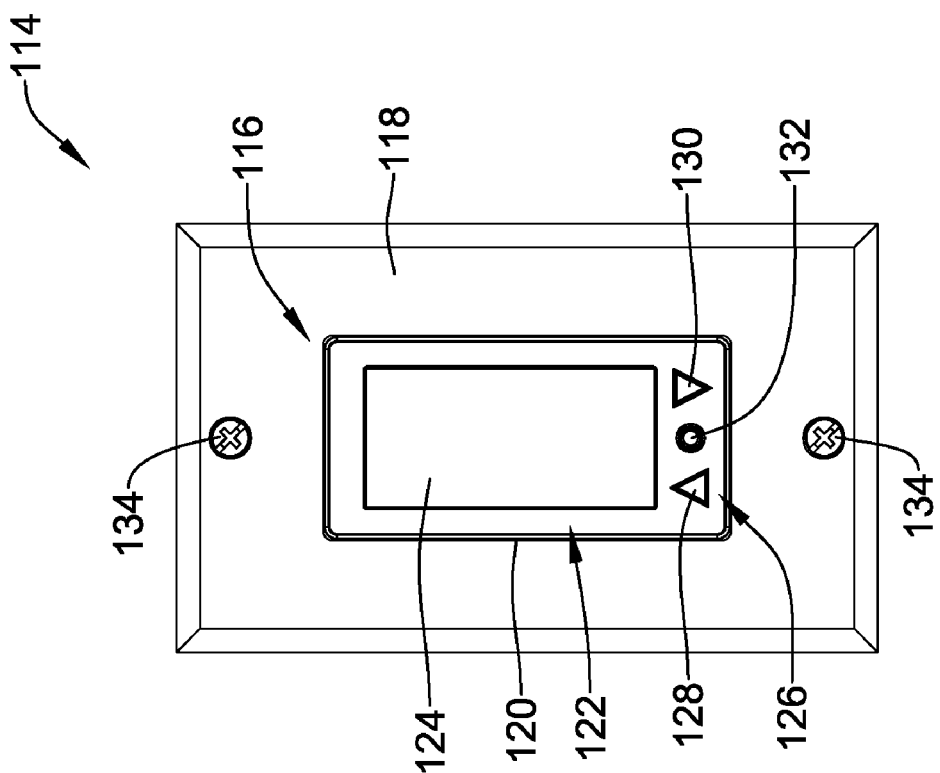
FIG. 7 is a front view of a controller and decorative wall plate in accordance with an illustrative but non-limiting example of the present invention.

FIG. 7 is a front view of an illustrative assembly 130 that includes a thermostat 116 and a wall plate 118. Wall plate 118 includes an aperture 120 through which a projection 122 may at least partially extend. As illustrated, projection 122 may include a display panel portion 124 and a control panel portion 126. Display panel portion 124 and control panel portion 126 may be located within a single projection 122, or may be distinct projections disposed adjacent one another. In some cases, thermostat 116 may include a touch screen incorporated into projection 122. In such an instance, the touch screen may replace both display panel portion 124 and control panel portion 126.

Display panel portion 124 may include or be any suitable display structure that is configured to provide a visual representation discernible to the human eye. In some cases, display panel portion 124 may be an LCD display and may be used to convey a variety of information to a user.

Control panel portion 126 may, as illustrated, include an up arrow button 128, a down arrow button 130 and a select button 132. These buttons may be used to control and/or program thermostat 116, as discussed previously with respect to FIG. 1. In some cases, up arrow button 128 may be used to raise a parameter such as a temperature set point while down arrow button 130 may be used to lower a parameter such as a temperature set point. Select button 132 may, for example, be used to select or otherwise maneuver through a programming menu.

In some cases, thermostat 116 may be configured to fit into a single gang junction box. Wall plate 118 may include apertures configured to accommodate screws 134 that may be used to secure wall plate 118 to thermostat 116, or, in some cases, directly to a single gang junction box. In some instances, thermostat 116 may be configured to fit into a single gang of a larger junction box. The gang or gangs not filled by thermostat 116 could be used for other electrical devices.

In some cases, projection 122 may be rectangular or substantially rectangular in shape, and may have a length of about 60 to about 80 millimeters and a width of about 30 to about 40 millimeters. In some instances, as illustrated, aperture 120 within wall plate 118 may have a length of about 66 to about 67 millimeters and a width of about 33 to about 34 millimeters.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. An electronic controller that is configured to be mounted to a junction box, such that a wall plate, separate from the electronic controller and securable relative to the junction box, covers at least part of the electronic controller, wherein the wall plate includes one or more apertures, the electronic controller comprising:
   a display panel;
   a control panel arranged alongside the display panel, wherein the display panel and the control panel extend at least partially into the junction box when mounted relative to the junction box; and
   wherein the display panel and the control panel include one or more projections that extend at least partially into one or more of the one or more apertures in the wall plate when the wall plate is secured relative to the junction box.

2. The electronic controller of claim 1, wherein the display panel is configured to extend at least partially into a first aperture in the wall plate and the control panel is configured to extend at least partially into a second aperture, wherein the second aperture is spaced from the first aperture.

3. The electronic controller of claim 1, further comprising a housing having a front surface, wherein the display panel and the control panel each extending out from the front surface of the housing a distance of at least 5 millimeters and into a first aperture and a second aperture, respectively, of the wall plate.

4. The electronic controller of claim 3, wherein the junction box is a wall-mounted junction box having at least a first gang and a second gang, and wherein the housing of the electronic controller is configured to fit within the wall-mounted junction box.

5. The electronic controller of claim 1, wherein the display panel includes a projection that has a length of about 60 to about 80 millimeters and a width of about 30 to about 40 millimeters and is configured to fit into an aperture of a commercially available decorative wall plate.

6. The electronic controller of claim 1, wherein the control panel includes a projection that has a length of about 60 to about 80 millimeters and a width of about 30 to about 40 millimeters and is configured to fit into an aperture of a commercially available decorative wall plate.

7. The electronic controller of claim 1, wherein the display panel includes a projection and the control panel includes a projection, wherein the projection of the display panel and the projection of the control panel are spaced apart by a distance of about 10 to about 20 millimeters.

8. The electronic controller of claim 7, further comprising an external sensor connection disposed between the projection of the display panel and the projection of the control panel.

9. The electronic controller of claim 1 configured to control an in floor heating system.

10. The electronic controller of claim 1, wherein the display panel has a viewable area that is at least about 75 percent of an area of a first aperture of the wall plate.

11. The electronic controller of claim 1, wherein the display panel has a viewable area that is at least about 90 percent of an area of a first aperture of the wall plate.

12. A thermostat, comprising:
a housing having a front surface;
a display panel extending out from the front surface forming a first projection;
a control panel extending out from the front surface forming a second projection;
wherein the first projection is spaced from the second projection; and
wherein the front surface of the housing is configured to be at least partially covered by a decorative wall plate, with the first projection extending at least partially into a first aperture in the decorative wall plate, and the second projection extending at least partially into a second aperture in the decorative wall plate.

13. The thermostat of claim 12, wherein the first projection is substantially rectangular and has a vertical major dimension.

14. The thermostat of claim 13, wherein the display panel comprises an LCD display.

15. The thermostat of claim 12, wherein the second projection is substantially rectangular and has a vertical major dimension.

16. The thermostat of claim 15, wherein the second projection comprises a control panel surface and one or more control fixtures disposed on the control panel surface.

17. A thermostat assembly, comprising:
a thermostat comprising:
a housing having a front surface;
a display panel extending out from the front surface;
a control panel extending out from the front surface;
a wall plate, separate from the housing, having a first gang aperture and a second gang aperture, wherein the first gang aperture is spaced from the second gang aperture; and
wherein the wall plate is secured relative to the housing such that the display panel extends at least partially into the first gang aperture and the control panel extends at least partially into the second gang aperture.

18. The thermostat assembly of claim 17, wherein the housing is configured to be secured relative to a junction box.

19. The thermostat assembly of claim 17, wherein the housing comprises mounting tabs configured to be secured to a junction box having at least two gangs.

20. The thermostat assembly of claim 19, wherein the mounting tabs comprise apertures that accommodate screws mounting the housing to the junction box.

21. The thermostat assembly of claim 20, wherein the mounting tabs further comprise threaded apertures that accommodate screws mounting the wall plate relative to the housing.

22. The thermostat assembly of claim 17, wherein the wall plate further comprises a third gang aperture configured for receiving another electrical device.

23. The thermostat assembly of claim 17, wherein the first gang aperture has a length of about 66 to about 67 millimeters and a width of about 33 to about 34 millimeters.

24. The thermostat assembly of claim 17, wherein the second gang aperture has a length of about 66 to about 67 millimeters and a width of about 33 to about 34 millimeters.

25. A thermostat assembly, comprising:
a thermostat comprising:
a housing having a front surface;
a touch screen display panel extending out from the front surface forming a projection;
a wall plate, separate from the thermostat, having an aperture that is configured to extend across at least part of two gangs of a two or more gang junction box; and
wherein the touch screen display panel is configured to extend at least partially into the aperture of the wall plate when the wall plate is secured relative to the housing.

26. A thermostat assembly, comprising:
a thermostat comprising a projection, the projection comprising a display panel portion and a control panel portion; and
a wall plate, separate from the thermostat, having a single gang aperture;
wherein the wall plate is secured relative to the thermostat such that the projection extends at least partially into the single gang aperture.

27. The thermostat assembly of claim 26, wherein the wall plate is screwed to the thermostat.

28. The thermostat assembly of claim 26, wherein the thermostat is configured to be screwed to a junction box, with at least part of the thermostat extending into the junction box.

* * * * *